No. 796,014. PATENTED AUG. 1, 1905.
A. RECTOR.
INVERTED INCANDESCENT LAMP OR GAS BURNER.
APPLICATION FILED MAY 10, 1905.

3 SHEETS—SHEET 1.

WITNESSES:
W. H. Durand
J. P. Duffie

INVENTOR
Alcam Rector
By
John S. Duffie
Attorney

No. 796,014. PATENTED AUG. 1, 1905.
A. RECTOR.
INVERTED INCANDESCENT LAMP OR GAS BURNER.
APPLICATION FILED MAY 10, 1905.
3 SHEETS—SHEET 2.
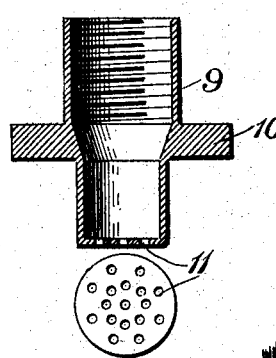
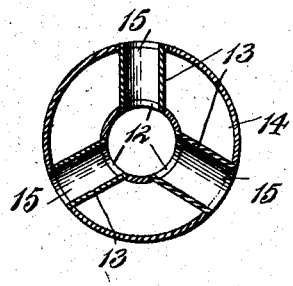
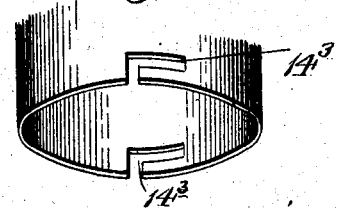
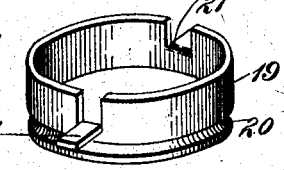
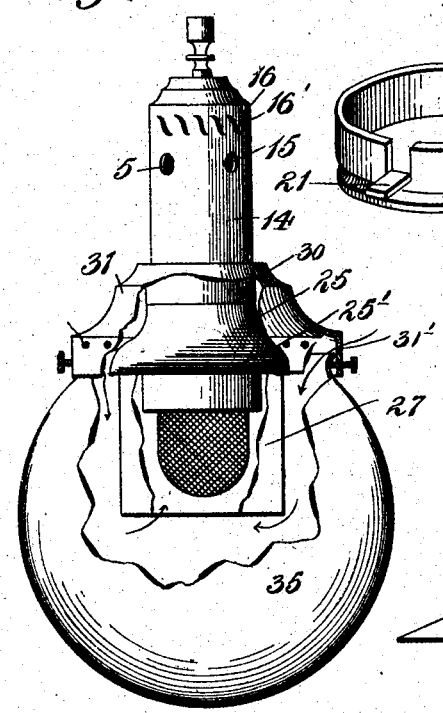
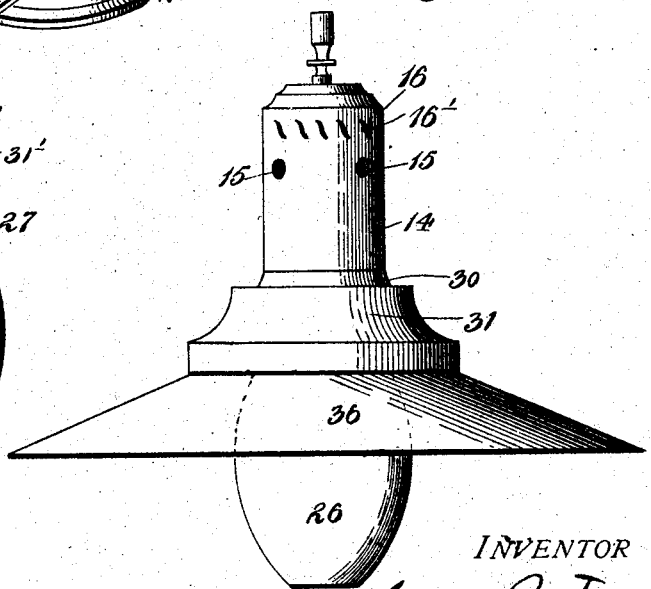
WITNESSES:
INVENTOR
By
Attorney No. 796,014. PATENTED AUG. 1, 1905.
A. RECTOR.
INVERTED INCANDESCENT LAMP OR GAS BURNER.
APPLICATION FILED MAY 10, 1905.
3 SHEETS—SHEET 3.
Fig. 9.
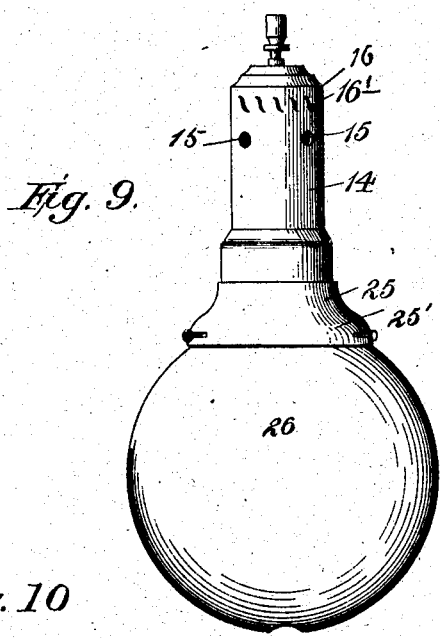
Fig. 10.
Fig. 11.
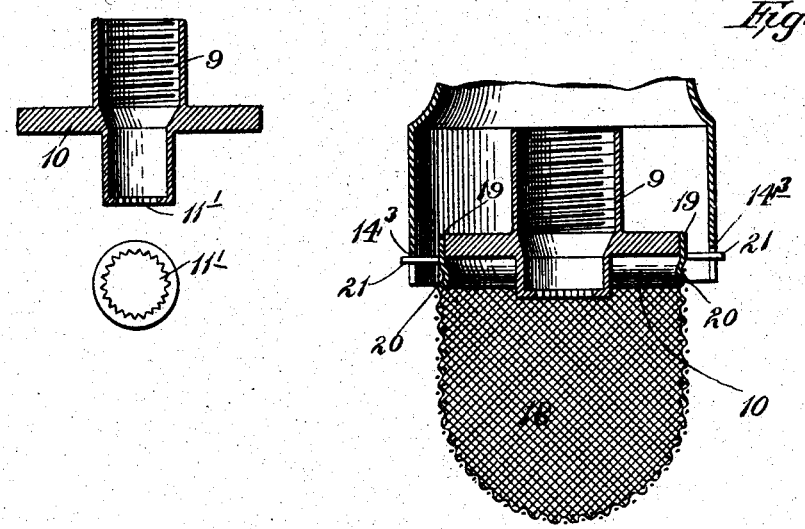
WITNESSES:
W. N. Durand
J. P. Duffie
INVENTOR
Alcam Rector
BY
John S. Duffie
Attorney

UNITED STATES PATENT OFFICE.

ALCORN RECTOR, OF NEW YORK, N. Y.

INVERTED INCANDESCENT LAMP OR GAS-BURNER.

No. 796,014.  Specification of Letters Patent.  Patented Aug. 1, 1905.

Application filed May 10, 1905. Serial No. 259,701.

*To all whom it may concern:*

Be it known that I, ALCORN RECTOR, a citizen of the United States, residing at New York, in the county of New York and State of New York, have invented new and useful Improvements in Inverted Incandescent Lamps or Gas-Burners, of which the following is a specification.

My invention is an inverted incandescent lamp or gas-burner; and it consists of means for introducing air into the mixing-tube to mix with the gas as it passes the point of the regulating needle-valve and of means for increasing and intensifying the light, while at the same time it reduces the consumption of gas, as illustrated in the accompanying drawings and described in the following specification and claims.

Figure 1:
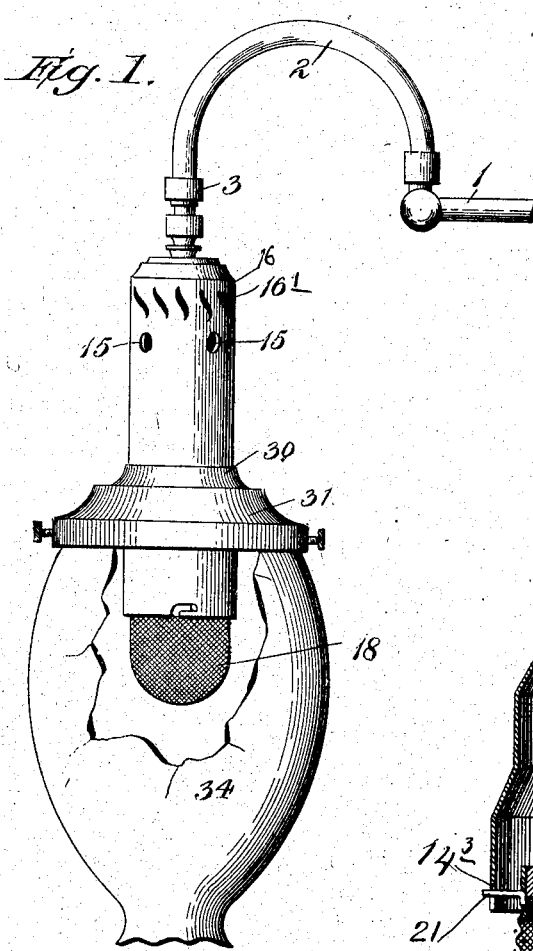
Figure 2:
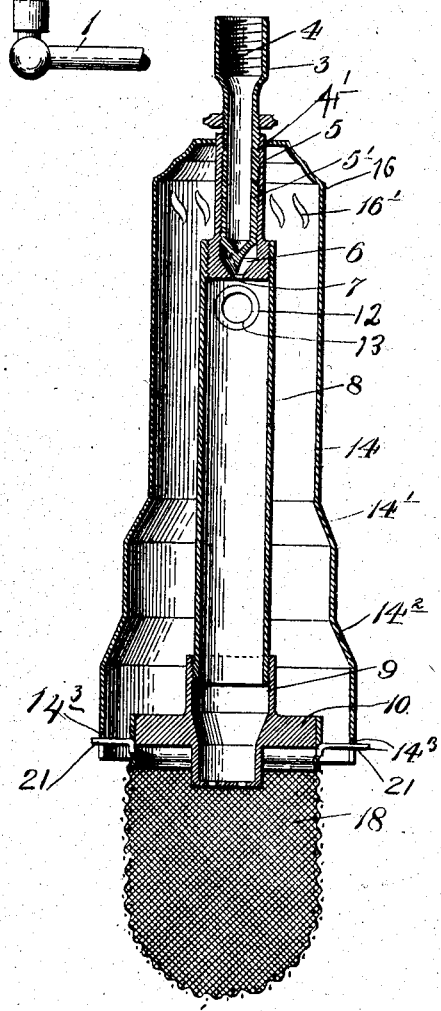

In the accompanying drawings, Figure 1 is an elevation of my invention, the globe partly broken away. Fig. 2 is a longitudinal sectional view showing the draft or intensifying tube, lateral air-tubes, regulating needle-valve, burner-head, and mantle. Fig. 3 is a vertical sectional view of the burner-head, outer casing, and perforated bottom of the burner-head. Fig. 4 is a cross-sectional view of Fig. 1 on the line X X. Fig. 5 is a perspective view of the lower end of the draft or intensifying tube, showing two bayonet-slots on the lower end thereof. Fig. 6 is a perspective view of a band having handles. Fig. 7 is a perspective view of my invention, showing in addition to what is shown in Fig. 3 a glass tube covering the mantle and a globe without an opening at its lower end and a device for holding said glass tube. Fig. 8 is a perspective view of my invention, in which is used a bulb in lieu of the glass cylinder to give an electric-light effect. Fig. 9 is an elevation more fully showing the bulb with its holder. Fig. 10 is a repetition of Fig. 3, showing a star-opening in the bottom of the burner-head instead of perforations. Fig. 11 is a vertical sectional view of the burner-head, protecting-plate, mantle, and lower end of draft or intensifying tube.

My invention is described as follows:

The numeral 1 represents an arm of a gas fixture or chandelier.

2 represents a gooseneck-tube, and 3 represents the regulating needle-valve. The inner wall of said regulating needle-valve is provided with a thread 4, into which the free end of the gooseneck is screwed. The outer surface of the regulating needle-valve is also provided with a thread 4'. Fitting around said needle-valve is a guide-tube 5, having an internal thread 5', which meshes with the external thread 4' of said needle-valve. Secured to the lower end of said guide-tube 5 and integral therewith is a cylindrical cup 6, provided in its bottom with a perforation 7, so that when said cup is turned to the right it ascends by means of said mentioned threads and forces the point of the needle-valve into said perforation 7, and when said cup is turned to the left it descends, withdrawing said point from said perforation. The flow of the gas is thus regulated at will. A mixing-tube 8 has its upper end securely threaded to said cup, so that when said mixing-tube is revolved it carries with it said cup and causes it to rise or fall, as before described. Secured to the lower end of said mixing-tube is a burner-head 9, and projecting from said burner-head is a circular extension or protecting flange 10. The purpose of this flange is to keep the burner-head and mixing-tube from getting too hot, because if they get beyond a certain temperature it changes the mixture of gas and air, making combustion imperfect. Imperfect combustion causes soot to form on the burner-head. This is prevented by the flange, because it forces the flame through the mesh of the mantle, brightening it and preventing the flame from coming in direct contact with the burner-head and mixing-tube, keeping them moderately cool. The mantle 18 is held in the center of the draft or intensifying tube 14 and at the proper height on the burner-head 9 by means of a band 19. The circular extension or protecting flange 10 holds the mantle in the center of the draft-tube 14. The handles 21, fitting in and meshing with bayonet-slots $14^3$, located at the extreme lower end of the draft-tube 14, hold the mantle at the proper height. The lower end of the burner-head is provided with a perforated bottom 11. The purpose of this perforated bottom is to hold the flame at this point and prevent it from flashing back into the mixing-tube. The bottom 11', as shown in Fig. 10, has a star-shaped opening, which performs the same service as the bottom 11, (shown in Fig. 3,) and I have found in my experiments that this last-mentioned bottom 11' causes the flame to project a greater distance from the burner-head than the bottom 11 and, indeed, at a greater distance than any other bottom I have been able to use. Different shaped glassware used in connection with my invention causes different drafts to pass through the lamp, making it preferable to use the different kinds of bottoms. Said mixing-tube 8 is provided with three or more perforations 12, and extending from each one of these perforations outwardly is an air-tube 13. Surrounding said guide-tube 5, mixing-tube 8, burner-head 9, and protecting-flange 10 is a draft or intensifying tube 14, provided at its upper end with perforations 16' and at its lower end with an upper shoulder 14' and a lower shoulder $14^2$. This draft or intensifying tube is also provided with circular perforations 15, which register with the perforations 12 in the mixing-tube, and the outer ends of the air-tubes 13 pass through said perforations 15 and are secured therein. Said draft or intensifying tube extends upward to the top of the guide-tube 5 and is secured thereto, so that when said draft-tube is revolved the said mixing-tube is also revolved, thereby regulating the lamp and controlling the consumption of gas. The upper end or head 16 of the draft or intensifying tube is provided with slot-perforations 16' for the escape of heat generated by the flame below.

It will be observed that the air enters the mixing-chamber immediately below the point of the needle-valve and mixing with the gas produces a thorough combination before it passes through the bottom of the burner-head. In all other inverted lamps that have come under my observation air is introduced into the mixing-chamber above the point where the heat passes from the upper framework of the lamp and mixes with the gas. Hot air from the flame is detrimental to the combustion of the gas by the lamp, as it causes soot to collect upon the burner-head. While hot air from the flame is injurious, warm air mixes more readily with gas, forming a better compound.

It will be observed that while the air enters the perforations 15 through the air-tubes 13 into the mixing-tube 8 the heat passes up from the burner-head through the draft or intensifying tube, warming the mixing-tube and the hot-air tubes 13, and thus warms the air as it passes through said air-tubes. The hot air from the flame passes up through the draft or intensifying tube and out of the openings in the head 16, and by no possibility can the hot air from the flame mix with the gas *en route* to the burner-head. The top of the draft or intensifying tube is closed, and the openings are around its circumference. The purpose of this is to spread the heat, and thereby keep it from burning anything immediately over the lamp.

The lower end of the draft or intensifying tube 14 is provided with two bayonet-slots $14^3$. The band 19 is provided near its lower end with an annular groove 20, in which is secured the upper end of said mantle. Said band is provided with two handles 21. The said band is pushed up into the lower end of said draft or intensifying tube, and the handles 21 are turned into said bayonet-slots. These handles are used to manipulate the mantle and to stop said band 19 at the proper place, so that the said handles can be turned into the bayonet-slots $14^3$.

Extending from the surface of the draft or intensifying tube near its lower end and resting on shoulder $14^2$ is a band 25, enlarged at its lower end, which enlargement forms the bulb-holder 25'. A bulb 26 is secured to said bulb-holder in any practical way. Said bulb is preferably made of opal glass, which gives an electric effect to the light. Sometimes instead of using a bulb 26 I use a short glass tube 27, which is secured to the same bulb-holder just described. A short distance above said bulb-holder 25 and fitting around said draft or intensifying tube is another band 30. Extending from said band 30 outwardly and downwardly is a globe-holder 31, provided with three screws which hold a globe. In said globe-holder is secured a globe 34, as shown in Fig. 1, or a globe 35, as shown in Fig. 7, or a shade 36, as shown in Fig. 8. Any other style of globe or shade applicable to this kind of lamp may be used.

My lamp is so constructed that I may use with it globes open or closed at the bottom. When using a closed globe, as shown in Fig. 7, I provide the globe-holder with air-inlets 31', as shown in Fig. 7, and use a short glass tube 27 in connection with the closed globe, in which case the cold air passes down over the top of the globe, through said air-inlets 31' to the bottom end of the tube 27, and then up through the draft or intensifying tube, as indicated by arrows.

The superior advantages of my lamp over all others may be summed up as follows: From its construction it allows the use of glassware open or closed at the bottom.

My draft or intensifying tube increases the brilliancy of the light by causing the gas, air, and flame to move more rapidly, rendering the heat units greater than in other lamps. The heat passes out at the top of the draft or intensifying tube. The air to be mixed with the gas is taken in through the lateral tubes below this point, rendering it impossible for the direct heat of flame to affect combustion. In all other inverted lamps that have come under my observation, the heat generated by the flame passes the point where the air is admitted to mix with the gas, effecting the combustion. The effect of the heat from the flame causes imperfect combustion of gas, producing soot and destroying the brilliancy of the light, because the oxygen has not been completely consumed.

My draft or intensifying tube serves two purposes: First, it creates a draft; second, it heats the mixed air and gas, thereby increasing the brilliancy of the light by rendering combustion more rapid.

My regulating needle-valve and burner in the mantle enable me to turn the gas low without causing smoke.

By my method I carry the heated air up between the inner wall of the draft or intensifying tube and the outer wall of the mixing-tube, passing between and around the lateral air-tubes, thus heating the air before it enters the mixing-tube.

My draft or intensifying tube is larger at its lower end than at its top. This is to prevent the blaze from striking against the inner wall of the tube and burning it.

Having described my invention, what I claim as new, and desire to secure by Letters Patent, is—

1. In an inverted incandescent gas-burner, a supply-tube, having a needle-valve at its lower extremity; a regulating-thimble on said supply-tube; a mixing-tube fixed to said thimble; a draft-tube and air-inlet tubes connecting said draft-tube to said mixing-tube, whereby the rotation of the draft-tube regulates the gas-supply, and the incoming air receives heat from the products of combustion, substantially as shown and described and for the purposes set forth.

2. In an inverted incandescent lamp, the combination of a supply-tube, having one end secured to a gas-fixture, its other end externally threaded; a regulating needle-valve, its upper end connected to said supply-tube, its lower end externally threaded; a guide-tube, working on said needle-valve, its lower end terminating in a cylindrical cup, having in its bottom a perforation; a mixture-tube, secured to said cup, and provided, below said cup, with perforations; a burner-head, secured to the lower end of said mixing-tube; a perforated bottom, secured to the lower end of said burner-head; a draft-tube, surrounding said mentioned parts; oxygen-tubes, secured in, and extending from the perforations in the mixing-tube to corresponding perforations in the draft-tube; and mantle and shade supports, substantially as shown and described and for the purposes set forth.

3. A regulating needle-valve, its upper end adapted to be secured to a gas-fixture, its lower end externally threaded; a guide-tube, surrounding the lower portion of said needle-valve, and internally threaded, meshing with the external thread of said needle-valve; a cup, secured to the lower end of said guide-tube, and having in its bottom a perforation; a mixing-tube, secured to said cup, and provided with inlets immediately below said cup; a burner-head, secured to the lower end of said mixture-tube; a perforated bottom, secured to the lower end of said mixing-tube, and a mantle, adapted to be attached to the lower end of said burner-head, substantially as shown and described and for the purposes set forth.

4. The combination of the gooseneck-tube 2; regulating needle-valve 3, having its upper end enlarged and internally threaded, and its lower end externally threaded; a guide-tube 5, provided with an internal thread, which meshes with the external thread of the needle-valve, and its lower end terminating in a cylindrical cup 6, having in its bottom a perforation 7, the outer surface of said cup being provided with a thread; a mixing-tube 8, provided at its upper end with an internal thread, screwing onto said cylindrical cup, and below said cup, with perforations 12; a burner-head 9, secured to the lower end of said mixing-tube: a perforated bottom, secured to the lower end of said burner-head; a circular extension or protecting flange 10; a draft or intensifying tube surrounding and inclosing said mentioned parts, said tube being provided near its upper end with perforations, and near its lower end with bayonet-slots; lateral air-tubes 12, securing said draft-tube to said mixing-tube; a band 19, provided with an annular groove 20, and handles 21, adapted to be secured in said draft or intensifying tube; a mantle 18, secured to the lower end of said band 19; a band 25, surrounding said draft or intensifying tube, adapted to fit on the lower shoulder of said tube, and enlarged at its lower end, forming a holder 25, adapted to carry glass furnishings; a band 30, fitting around the upper shoulder of said draft-tube, and running outwardly and downwardly forming a holder 31, said holder adapted to carrying suitable glass furnishings, substantially as shown and described and for the purposes set forth.

5. In an inverted incandescent lamp, the combination of a tube, having one end secured to a gas fixture or chandelier, its other end externally threaded; a regulating needle-valve, its upper end enlarged and internally threaded, its lower end externally threaded a guide-tube, its upper end internally threaded, and meshing with the external thread of said needle-valve, its lower end terminating in a cylindrical cup having in its bottom a perforation 7; a mixing-tube, secured to said cup, and provided below said cup with perforations; a burner-head, secured to the lower end of said mixing-tube; a perforated bottom, secured to the lower end of said burner-head; a draft or intensifying tube surrounding said parts; air-tubes, secured in and extending from the perforations in the mixing-tube to corresponding perforations in the draft-tube; a band, secured to the lower end of said draft-tube, and a mantle secured to said band, said draft-tube provided with means for holding a bulb and glass furnishings, substantially as shown and described and for the purposes set forth.

6. A regulating needle-valve, adapted to be secured to a gas-fixture, its lower end threaded; a guide-tube, having its upper end threaded, said thread meshing with the thread of said needle-valve; a cup, secured to the lower end of said guide-tube, and having in its bottom a perforation; a mixing-tube, secured to said cup, and provided with inlets immediately below said cup; a burner-head, secured to the lower end of said mixing-tube; a perforated bottom, secured to the lower end of said burner-head; a draft-tube, surrounding and inclosing said parts, and a mantle attached to the lower end of said draft-tube, substantially as shown and described and for the purposes set forth.

In testimony whereof I affix my signature in presence of two subscribing witnesses.

ALCORN RECTOR.

Witnesses:
NETTIE A. BETARD,
ROSE SCHROEDLE.